United States Patent [19]
Tanaka et al.

[11] Patent Number: 6,012,284
[45] Date of Patent: Jan. 11, 2000

[54] ENGINE EXHAUST GAS PURIFYING SYSTEM

[75] Inventors: Masakazu Tanaka; Kinji Hodaira, both of Okazaki; Tatsuo Sakai; Hiroyuki Usami, both of Kariya, all of Japan

[73] Assignee: Denso Corporation, Kariya, Japan

[21] Appl. No.: 09/080,283

[22] Filed: May 18, 1998

[30] Foreign Application Priority Data

May 21, 1997 [JP] Japan ................................. 9-131361

[51] Int. Cl.[7] ........................................................ F01N 3/00
[52] U.S. Cl. ............................. 60/297; 60/284; 60/285; 60/287; 60/288
[58] Field of Search .......................... 60/295, 284, 285, 60/287, 288, 289, 324, 297

[56] References Cited

U.S. PATENT DOCUMENTS

| | | | |
|---|---|---|---|
| 5,349,816 | 9/1994 | Sanbayyashi et al. ................... | 60/277 |
| 5,410,875 | 5/1995 | Tanaka et al. ............................ | 60/288 |
| 5,584,177 | 12/1996 | Oketani et al. . | |
| 5,634,332 | 6/1997 | Tanaka et al. ............................ | 60/284 |
| 5,647,206 | 7/1997 | Yamamoto et al. ...................... | 60/297 |
| 5,761,902 | 6/1998 | Usami et al. ............................. | 60/288 |

FOREIGN PATENT DOCUMENTS 6-93844  4/1994  Japan .

*Primary Examiner*—Thomas Denion
*Assistant Examiner*—Binh Tran
*Attorney, Agent, or Firm*—Pillsbury Madison & Sutro LLP

[57] ABSTRACT

Exhaust gas is caused to flow through a bypass passage during an adsorption mode. At this time, an adsorbing member adsorbs harmful components, e.g. HC, of the exhaust gas. Also, exhaust gas is caused to flow through the bypass passage to thermally desorb the harmful component held at the adsorbing member during a desorption mode. A quantity of heat given from exhaust gas to the adsorbing member during the desorption mode is calculated based on an operation state of an engine. It is determined that the desorption of the harmful components has been finished when the quantity of heat given to the adsorbing member reaches a total quantity of heat required for totally desorbing the harmful components adsorbed by the adsorbing member.

24 Claims, 13 Drawing Sheets

ENGINE EXHAUST GAS PURIFYING SYSTEM

CROSS REFERENCE TO RELATED APPLICATION

This application is based upon and claims the benefit of priority of Japanese Patent Application No. H.9-131361 filed on May 21, 1997, the contents of which are incorporated by reference.

BACKGROUND OF THE INVENTION

1. Field of the Invention

The present invention relates to an engine exhaust gas purifying system.

2. Description of Related Art

As a system for purifying exhaust gas of a car engine, there is a catalytic converter system for purifying HC, CO, NOx and the like in exhaust gas by an oxidation reaction or an oxidation-reduction reaction, in which a carrier carrying noble metal such as platinum and rhodium as a catalyst is provided within an exhaust pipe.

In the catalytic converter system, the catalyst needs to be heated up to its activation temperature, e.g. 300° C. to 400° C. or more, to purify exhaust gas. However, it has had a problem that because it adopts a method of heating the catalyst by exhaust gas in general, the catalyst does not reach the activation temperature and almost no exhaust gas is purified right after the engine is started.

Then, it has been arranged so that a catalyst reaches the activation temperature as soon as possible by heat of exhaust gas by disposing the catalyst in the vicinity of the engine, by changing the carrier carrying the catalyst from ceramic to metal having better thermal conductivity or by forcibly heating the catalyst by a heater provided in the carrier.

Meanwhile, due to the tightening of the so-called regulation of exhaust gas, it is assumed to be required to increase the rate of purification over the harmful gas components such as HC, CO and NOx further for the future. In order to achieve that, it is necessary to purify exhaust gas from right after the start of the engine, for example, by disposing the catalyst at position closer to the engine. However, if the catalyst is put closer to the engine, the catalyst is exposed to hot exhaust gas. Then, there arises a problem that the purification rate drops in contrary because the catalyst deteriorates quickly under hot conditions in general.

In order to eliminate such a problem, there has been proposed an arrangement, as disclosed in Japanese Patent Application Laid-Open No. H. 6-93844 for example, in which an exhaust pipe is ramified near the engine so as to create a main passage and a bypass passage, an adsorbing member is disposed in the bypass passage and a main catalyst is disposed at the downstream side of a region where the bypass passage joins again with the main passage. A change-over valve (opening/closing mechanism) is provided at the region near the engine where the exhaust pipe is ramified. When a temperature of exhaust gas is low right after the start of the engine for example, the exhaust gas is caused to flow through the bypass passage by closing the main passage and by opening the bypass passage. As a result, the harmful components, or HC in particular is adsorbed by the adsorbing member when the temperature of the catalyst is low. When the engine is warmed up and combustion therein is stabilized, the change-over valve is switched so that the exhaust gas flows through the main passage. The low temperature HC remains adsorbed by the adsorbing member until the catalyst reaches its activation temperature. Then, when the exhaust gas becomes hot and the main catalyst is warmed up fully by the hot exhaust gas, the bypass passage is opened slightly by manipulating the change-over valve. As a result, the exhaust gas flows through the bypass passage and thereby the low temperature HC held by the adsorbing member is thermally desorbed. The desorbed HC is purified by the main catalyst disposed on the downstream side.

However, because the adsorbing member does not have enough heat resistance, it deteriorates when exposed to the hot exhaust gas for a long period of time. Further, pressure loss of the engine increases when exhaust gas is caused to flow through the adsorbing member. Due to that, even when the HC is desorbed below the heat resistant temperature of the adsorbing member, the drivability and fuel consumption drop during that time. Still more, because an amount of oxygen enough for purifying the desorbed HC, in addition to the harmful components which are emitted from the engine, is required, an air-fuel ratio must be slid to the lean side from the stoichiometric ratio. However, the rate of purification over NOx drops in engine operation shifted to the lean side. Accordingly, a period of the desorption process must be accurate and be shortened as much as possible.

Due to that, physical quantities such as temperature of an input/output section of the adsorbing member, temperature of the main catalyst, the air-fuel ratio and the like must be measured accurately in the desorption process performed by the exhaust gas purifying system described above and various sensors are added for that end. As a result, it has had problems that its control logic is complicated and the cost of the system increases.

SUMMARY OF THE INVENTION

Accordingly, it is an object of the present invention to provide an engine exhaust gas purifying system which allows the disposal of exhaust gas to be optimized by accurately grasping a state of harmful component desorption from an adsorbing member with a simple arrangement without adding dedicated sensors.

According to the present invention, a switching control device controls an exhaust gas passage switching device so that exhaust gas flows through a bypass passage to adsorb harmful components, e.g. HC, within the exhaust gas by an adsorbing member during an adsorption mode. Also, the switching control device controls the exhaust gas passage switching device so that the exhaust gas flows through the bypass passage to thermally desorb the harmful component held at the adsorbing member during a desorption mode. Here, given heat quantity calculating device calculates a quantity of heat given from exhaust gas to the adsorbing member during the desorption mode based on an operation state of an engine. That is, because a quantity of heat of exhaust gas after the engine has been warmed up correlates with the operation state of the engine, in particular with an exhaust gas flow rate, the quantity of heat given from exhaust gas to the adsorbing member can be calculated when a thermal capacity of the adsorbing member is known. Then, it is determined that the desorption of the harmful components has been finished when the quantity of heat: given to the adsorbing member reaches a total quantity of heat required for totally desorbing the harmful component adsorbed by the adsorbing member.

In response to the determination that the harmful components have been totally desorbed, the switching control device controls the exhaust gas passage switching device to cause the exhaust gas to flow through the main exhaust passage.

Accordingly, while sensors for measuring temperature and the like have been necessary in the past to detect the end of the desorption process, no special sensor needs to be provided in the present invention because the end of the desorption process can be detected by calculation.

It is noted that when the quantity of heat calculated by the given heat quantity calculating device reaches a predetermined quantity of heat, the exhaust gas passage switching device may be controlled so as to cause the exhaust gas to flow through the main exhaust passage. Due to this, it is possible to compensate the quantity of heat taken from the catalyst during the desorption process. Thereafter, the exhaust gas passage switching device is controlled so as to cause the exhaust gas to flow through the bypass passage again. When the total quantity of heat calculated by the given heat quantity calculating device exceeds the quantity of heat required for totally desorbing the harmful component, the exhaust gas passage switching device is controlled so as to cause the exhaust gas to flow through the main exhaust passage assuming that the desorption of the harmful component has been finished.

That is, because the adsorbing member takes the quantity of heat from exhaust gas during the process of desorbing the harmful components, e.g. HC, within the exhaust gas, temperature of the exhaust gas flowing out of the adsorbing member drops. Therefore, the catalyst disposed on the downstream side thereof is cooled by the exhaust gas. At this time, the quantity of heat given to the adsorbing member is almost equal to the quantity of heat taken from the catalyst. For this reason, the temperature of the catalyst is found from the thermal capacity of the catalyst and the quantity of heat taken from the catalyst. When the temperature of the catalyst is below the activation temperature, e.g. 300° C., the exhaust gas passage switching device is switched so that the exhaust gas does not flow through the adsorbing member but flows directly to the catalyst to warm up the catalyst. After warming up of the catalyst, the exhaust gas is caused to flow through the bypass passage again to give the quantity of heat required for the total desorption of exhaust gas components to the adsorbing member. Thereby, the exhaust gas components can be totally desorbed from the adsorbing member and purified by the catalyst because the temperature of the catalyst is kept above the activation temperature.

The specific nature of the invention, as well as other objects, uses and advantages thereof, will clearly appear from the following description and from the accompanying drawings in which like numerals refer to like parts.

DESCRIPTION OF PREFERRED EMBODIMENTS

First Embodiment

A first embodiment of the present invention will be explained below with reference to the drawings.

Figure 1:
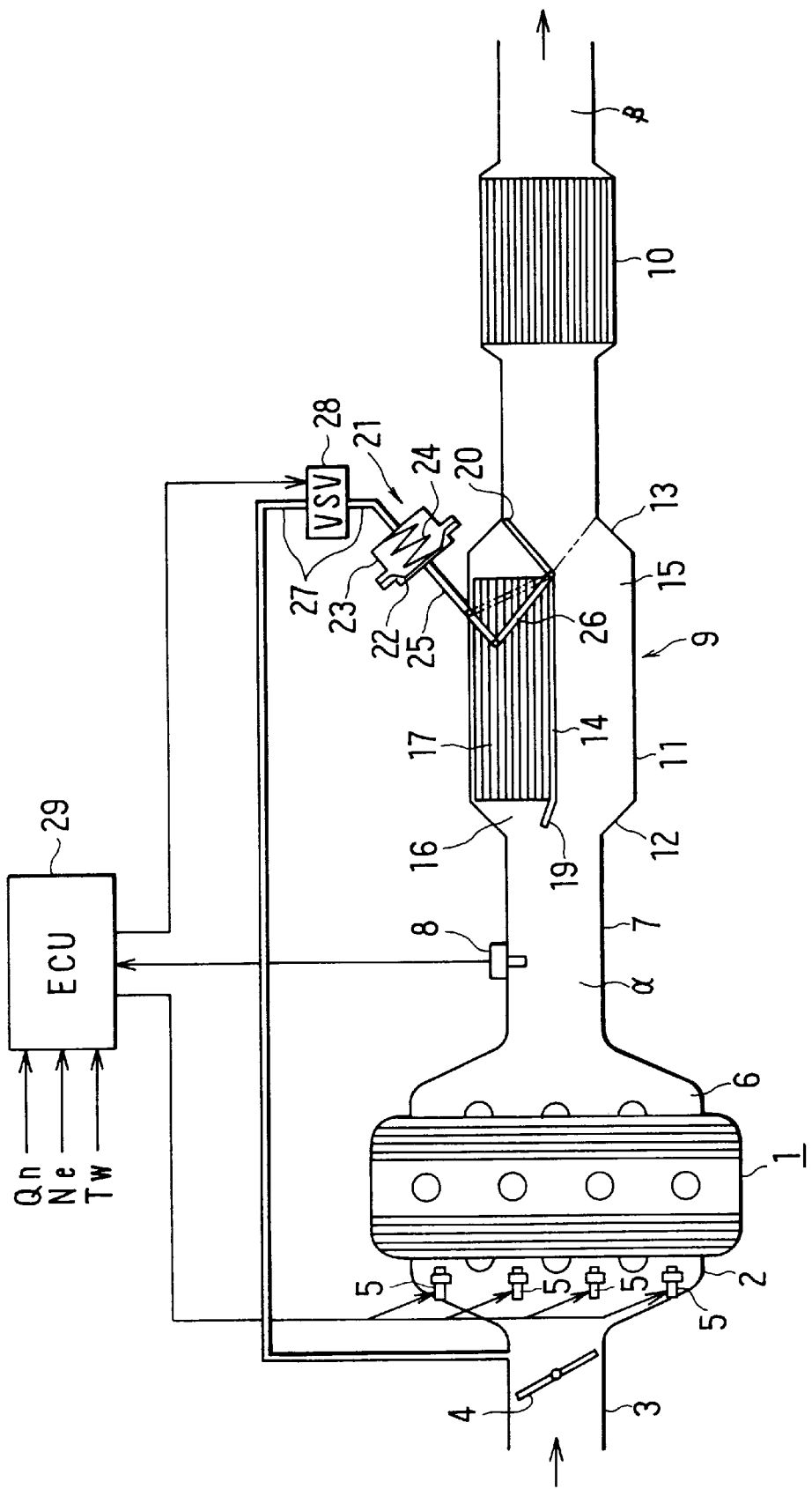
FIG. 1 is a schematic diagram showing the whole structure of an exhaust gas purifying system according to a first embodiment of the present invention.

FIG. 1 is a schematic diagram showing the whole structure of an engine exhaust gas purifying system according to the first embodiment. The engine is mounted in a car.

An intake pipe 3 is connected to the four-cylinder gasoline engine 1 via an intake manifold 2. A throttle valve 4 is disposed within the intake pipe 3. Injectors (fuel injection valves) 5 are disposed at intake ports of the respective cylinders of the engine 1.

An exhaust pipe 7 is connected to the engine 1 via an exhaust manifold 6. An 02 sensor 8 is provided in the exhaust pipe 7. Disposed on the downstream side of the 02 sensor 8 in the exhaust pipe 7 are an adsorption unit 9 and a tertiary catalyst 10.

Figure 2:
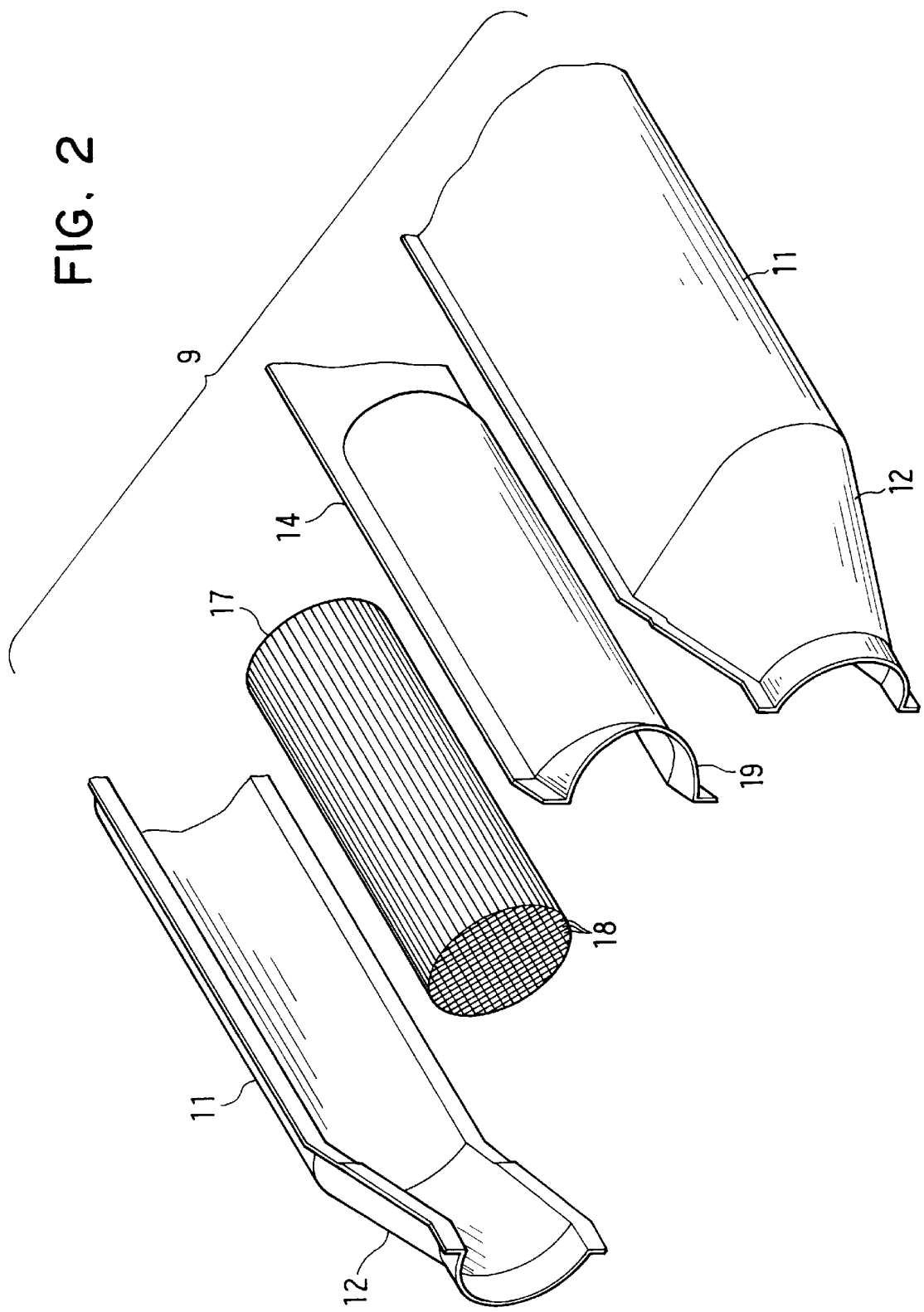
FIG. 2 is an exploded perspective view of an adsorption unit.

The adsorption unit 9 will be explained below in detail. FIG. 2 is an exploded perspective view of the adsorption unit 9. As shown in FIGS. 1 and 2, the adsorption unit 9 has a cylindrical housing 11 whose diameter is larger than that of the exhaust pipe 7. An end face of the housing 11 at its upstream side is connected to the exhaust pipe 7 by a tapered pipe 12 and an end face thereof at its downstream side is connected to the exhaust pipe 7 by a tapered pipe 13. A partition 14 is disposed within the housing 11 to create exhaust gas passages 15, 16 in parallel. That is, there are created the main exhaust passage 15 through which the exhaust gas of the engine reaches directly to the tertiary catalyst 10 and the bypass passage 16 through which the exhaust gas bypasses with respect to the main exhaust passage 15.

A columnar adsorbing member 17 is stored within the bypass passage 16. The adsorbing member 17 is formed into a honeycomb structure. The adsorbing member (honeycomb structure) 17 is separated from the main exhaust passage 15 and held in the bypass passage 16 by the partition 14. Accordingly, when hot exhaust gas passes through the main exhaust passage 15, its heat is transmitted immediately to the adsorbing member 17 via the partition 14. The adsorbing member 17 has a carrier of stainless steel or ceramic such as cordierite. The carrier has a columnar shape which fits within the housing (large diameter section) 11 and has a large number of parallel through holes 18 as shown in FIG. 2. Zeorite adsorbent is carried within the through holes 18. Accordingly, HC which is one of harmful components within exhaust gas is adsorbed by the adsorbing member 17.

Further, a rectifier plate 19 is provided in front of the adsorbing member 17 at the end of the partition 14 at its upstream side to uniform a distribution of flow rate of the exhaust gas when the exhaust gas flows through the adsorbing member 17 and thereby to improve the efficiency of adsorption. The partition 14 may be made in a single body with the rectifier plate 19 or may be made separately from the rectifier plate 19.

It is noted that the shape of the adsorbing member 17 may be formed into the shape of semi-circular column, elliptical column or prism, beside the columnar shape, as long as it fits in the shape of the housing (large diameter section) 11.

As shown in FIG. 1, a change-over valve 20 for switching the passages of exhaust gas is disposed at the end of the partition 14 at its downstream side within the housing 11. This change-over valve 20 is arranged so as to be capable of rotating between the positions shown by a solid line and by a broken line. The change-over valve 20 is driven by a diaphragm type opening/closing mechanism 21 as an actuator thereof. The diaphragm type opening/closing mechanism 21 has a tank 23 which is partitioned by a diaphragm 22 and in which a spring 24 is disposed. The diaphragm 22 is also connected to the change-over valve 20 via a shaft 25 and an arm 26. The spring chamber of the tank 23 communicates with the intake pipe (or more specifically with a serge tank) 3 via a communication pipe 27 which is provided with an electromagnetic valve (VSV: vacuum switching valve) 28 on the way thereof.

When the electromagnetic valve 28 is closed, the diaphragm 22 is pressed to the position shown by a solid line by biasing force of the spring 24 within the tank 23. As a result, the change-over valve 20 is placed at the position shown by the solid line. That is, the main exhaust passage 15 is opened and the bypass passage 16 is closed. When the electromagnetic valve 28 is opened from this state, intake negative pressure is applied to the spring chamber within the tank 23 via the communication pipe 27. As a result, the diaphragm 22 is displaced against the biasing force of the spring 24 and the change-over valve 20 rotates to the position shown by the broken line. In this state, the main exhaust passage 15 is closed and the bypass passage 16 is opened.

Thus, the change-over valve 20 functions as exhaust gas passage switching device (three way change-over valve) for passing the exhaust gas selectively through either the main exhaust passage 15 or the bypass passage 16.

In FIG. 1, there is provided an electronic control unit for controlling the engine (hereinafter referred to as an ECU) 29 which is mainly composed of a microcomputer. The ECU 29 controls the engine and the adsorption system.

More specifically, the ECU 29 receives an intake air amount signal (Qn) from an air-flow meter, an engine speed signal (Ne) from an engine speed sensor, an engine cooling water temperature signal (Tw) from a water temperature sensor, a signal from the $O_2$ sensor 8, a throttle opening detection signal and the like as signals for detecting an operation state of the engine 1. Then, the ECU 29 calculates a fuel injection amount corresponding to the operation state of the engine 1 detected by those signals and causes the injectors 5 to inject fuel. Specifically, the ECU 29 calculates a basic injection amount from the intake air amount signal Qn and the engine speed signal Ne and corrects the basic injection amount based on the engine cooling water temperature Tw or due to feed-back control with which an air fuel ratio is controlled to the stoichiometric air-fuel ratio based on the signal from the $O_2$ sensor 8. Further, the ECU 29 opens/closes the electromagnetic valve 28 corresponding to the operation state of the engine 1 controlled based on those signals, i.e., controls the change-over valve 20.

Figure 3:
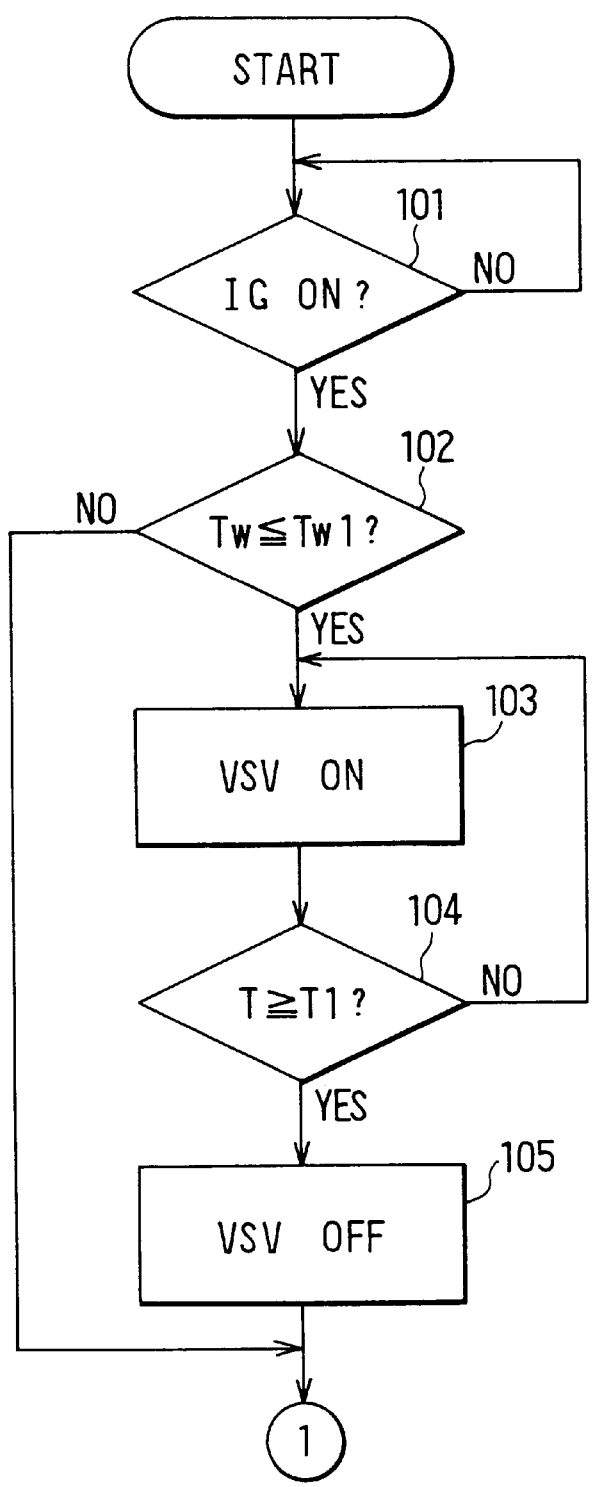
FIG. 3 is (a flow diagram showing an adsorption process according to the first embodiment.
Figure 4:
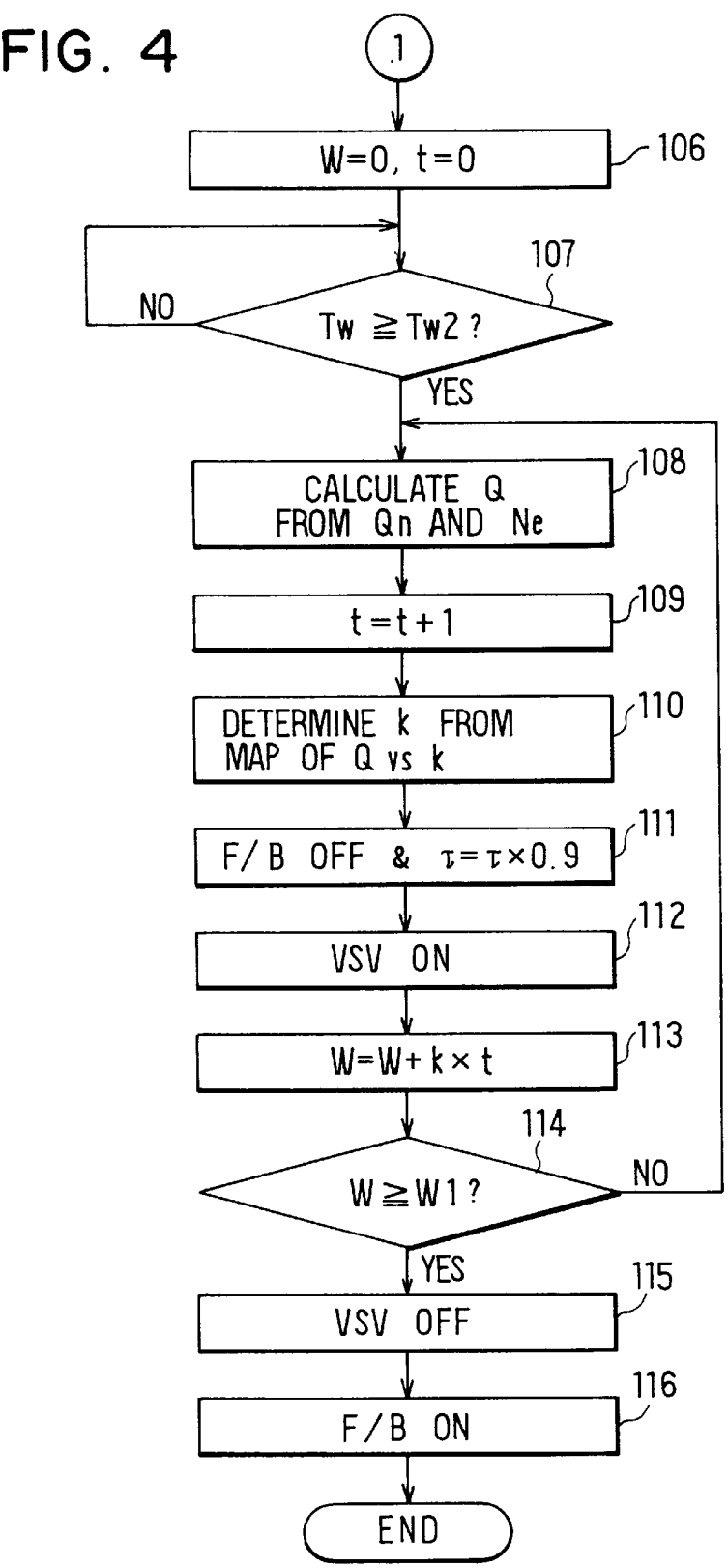
FIG. 4 is a flow diagram showing a desorption process according to the first embodiment.
Figure 5:
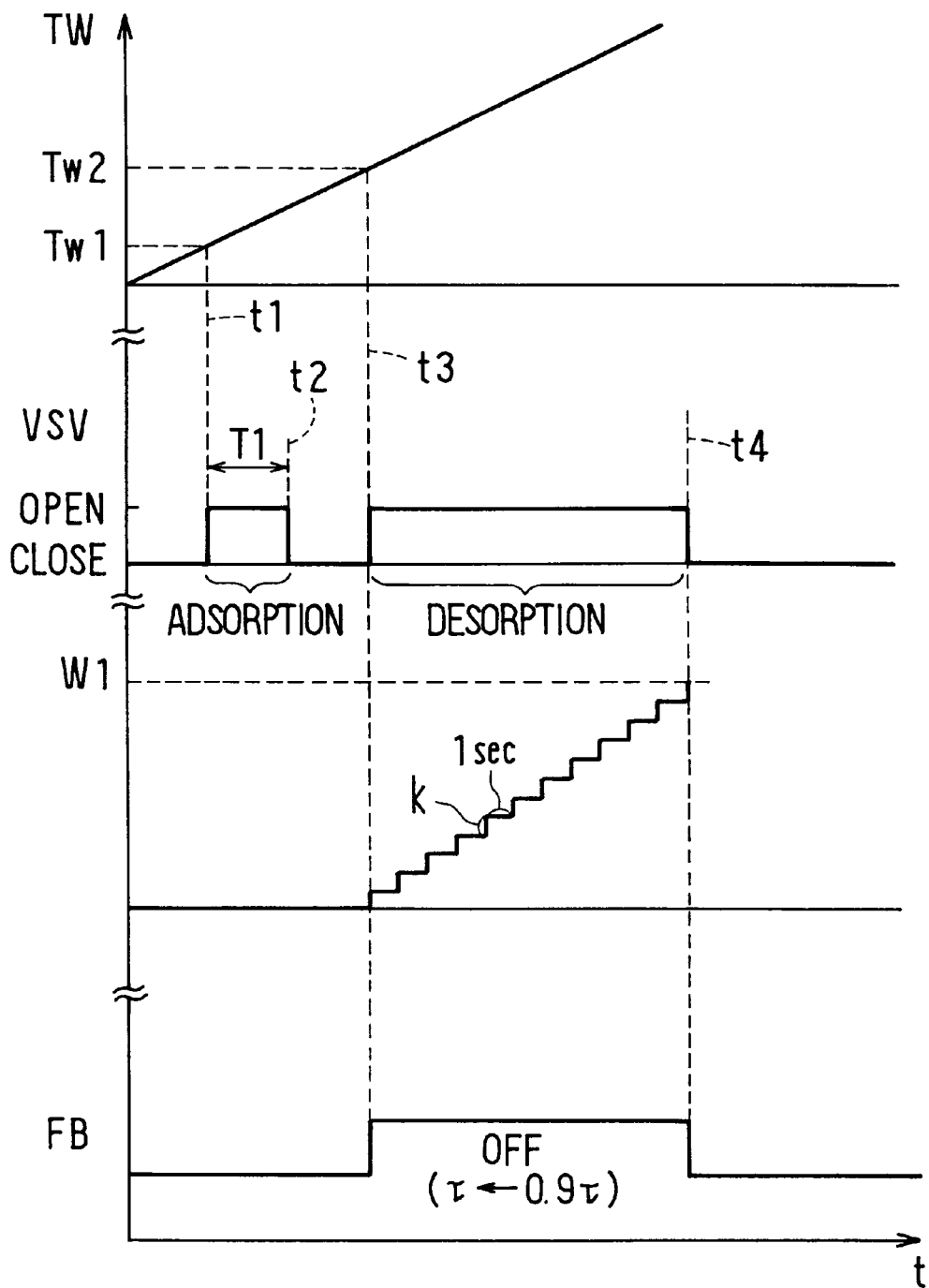
FIG. 5 is a time chart for explaining operations of the first embodiment.

Next, an operation of the engine exhaust gas purifying system constructed as described above will be explained. FIGS. 3 and 4 are flow diagrams showing steps of processing executed by the ECU 29 and FIG. 5 is a time chart for explaining the operation. As shown in FIG. 5, HC is adsorbed to the adsorbing member 17 during a period from t1 to t2 after the start of the engine 1 and then the HC is desorbed during a period from t3 to t4.

This operation will be explained below in detail.

When an ignition switch is turned on and the engine is started in Step 101 in FIG. 3, the ECU 29 determines by the signal from the engine water temperature sensor whether or not the engine water temperature Tw is below a temperature Tw1 (°C.) which allows the adsorbing member (honeycomb structure) 17 to adsorb HC in Step 102. When the engine is started cold, the adsorbing member 17 is cold. Then, when the engine water temperature Tw is below the adsorbable temperature Tw1, the ECU 29 shifts the process to Step 103 to turn on (open) the electromagnetic valve 28, whereby the main exhaust passage 15 is closed and the bypass passage 16 is opened (at timing t1 in FIG. 5).

The ECU 29 counts a time T since the electromagnetic valve 28 has been turned on (opened) and determines whether or not a predetermined time T1 has elapsed in Step 104. This predetermined time T1 corresponds to a time during which the engine 1 is warmed up and temperature of exhaust gas exceeds the adsorbable temperature of zeorite. The ECU 29 returns to Step 103 when the predetermined time T1 has not elapsed. It is noted that the state when the temperature of the exhaust gas exceeds the adsorbable temperature of zeorite may be determined also based on the engine water temperature Tw. Further, the predetermined time T1 can be set variable in response to the engine water temperature Tw when the engine 1 is started.

Figure 6:
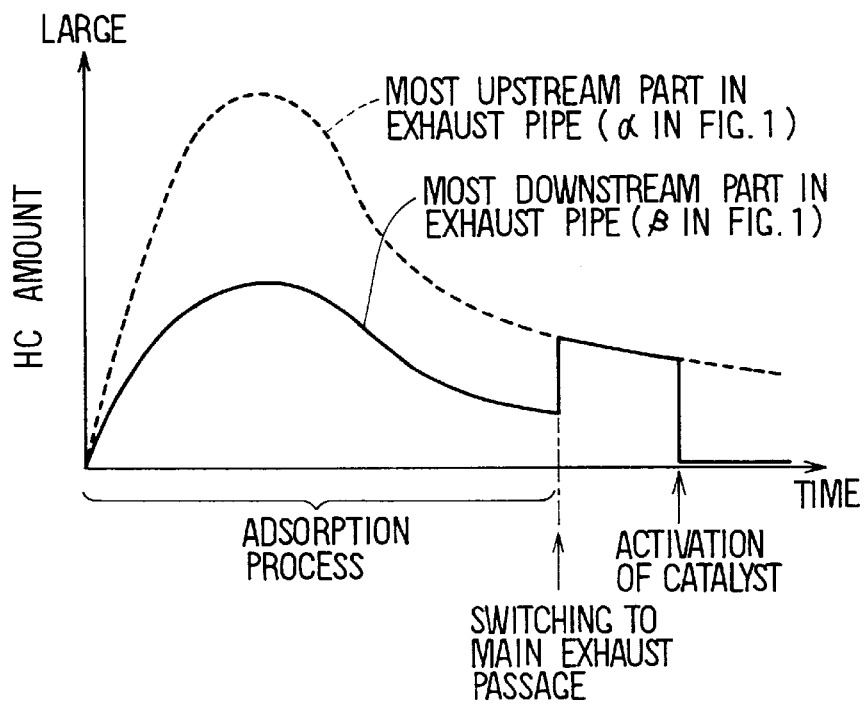
FIG. 6 is c time chart showing changes of an amount of HC.

In general, the temperature of the exhaust gas is low right after the engine 1 has been started and the engine 1 emits exhaust gas containing much cold HC as shown by a broken line in FIG. 6. The exhaust gas flows through the through holes 18 carrying zeorite of the adsorbing member (honeycomb structure, 17. Then, the cold HC is adsorbed by the zeorite and is removed from the exhaust gas as shown by a solid line in FIG. 6. This exhaust gas passes through the tertiary catalyst 10 and is emitted to the atmosphere via a muffler not shown. At this time, because the rectifier plate 19 rectifies the flow of the exhaust gas, the exhaust gas flows within the adsorbing member 17 under a uniform distribution of flow rate.

Then, when the time T exceeds the predetermined time T1 in Step 104 in FIG. 3, the ECU 29 shifts the process to Step 105 to turn off (close) the electromagnetic valve 28, whereby the supply of the negative pressure to the diaphragm 22 is shut off. As a result, the change-over valve 20 is switched to close the bypass passage 16 by the biasing force of the spring 24 via the shaft 25 and the arm 26 (at timing t2 in FIG. 5). Therefore, the passage through which exhaust gas flows is changed to the main exhaust passage 15. Because combustion of the engine is stable at this time, the exhaust gas discharged out of the engine 1 is hot and contains less HC. The tertiary catalyst 10 is warmed up while the system is operated in this state for several seconds to several tens of seconds. Consequently, the exhaust gas is purified by the catalyst 10 and the exhaust gas containing almost no HC is discharged to the atmosphere via the main exhaust passage 15 and the muffler.

After that, the ECU 29 advances to a process shown in FIG. 4 for desorbing the cold HC adsorbed in the adsorbing member (honeycomb structure) 17.

At first, before causing the exhaust gas to flow through the adsorbing member 17, the ECU 29 resets a quantity of heat W received from exhaust gas and a supply time t in Step 106. Then, the ECU 29 determines whether or not the engine 1 and the tertiary catalyst 10 are stable in an activated state. Specifically, it is determined whether the engine water temperature exceeds a predetermined temperature Tw2 in Step 107.

When the water temperature exceeds the predetermined temperature Tw2, the desorption process is started. The ECU 29 calculates an flow rate of intake air Q (liter/min) by multiplying an intake air amount Qn (liter/rev) per one rotation of the engine by the engine speed Ne (rpm) in order to find an exhaust gas flow rate in Step 108. It is noted that the value of Q needs not be found by multiplying the two values when it may be measured or calculated directly by the ECU 29 or from the specification of the engine.

The ECU 29 starts counting of the built-in timer in Step 109. It is noted that although the counting is carried out every second in 1he present embodiment, there is no limit specifically in the interval of the time to be counted.

Next, the ECU 29 calculates a quantity of heat given to the adsorbing member (honeycomb structure) 17, i.e. a quantity of heat given from exhaust gas to the adsorbing member 17 from the start of the desorption process, based on the intake air flow rate Q. According to a detailed study conducted by the inventors, it has been found that 10 kcal is enough for the honeycomb made of cordierite (400 cpi) having a capacity of 1000 cc as the quantity of heat required by the adsorbing member 17 1o completely desorb HC after the engine 1 and the tertiary catalyst 10 are stable in the activated state.

Figure 7:
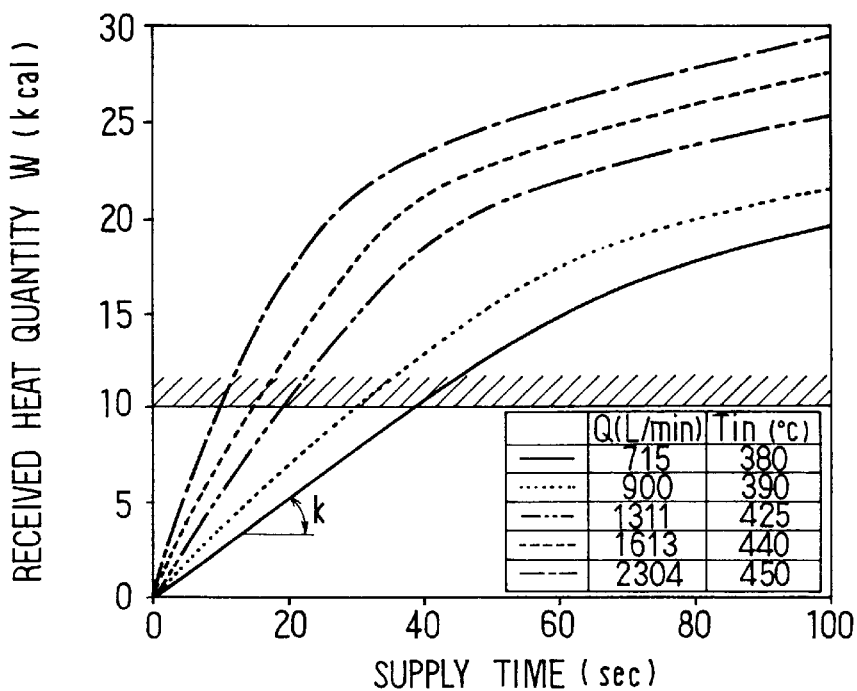
FIG. 7 is a graph showing a received heat quantity in the desorption process of the first embodiment.
Figure 8:
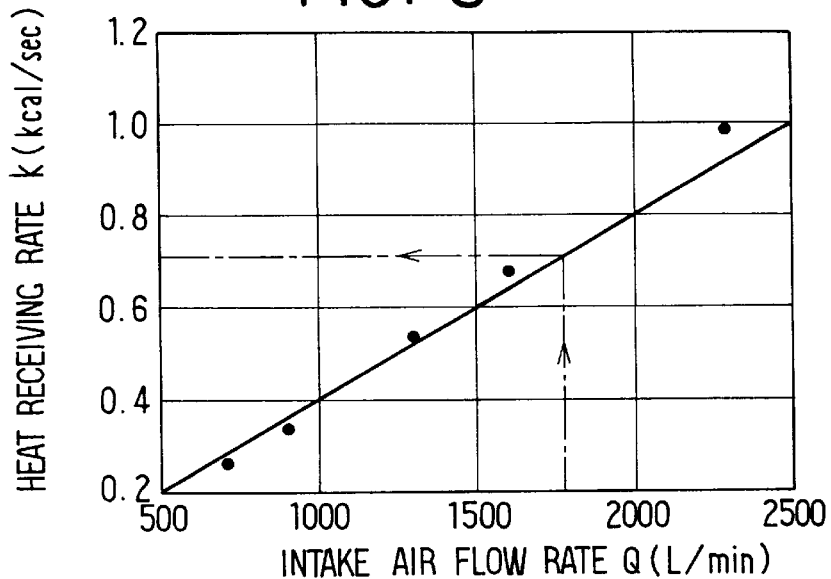
FIG. 8 is a graph showing a heat receiving rate in the desorption process of the first embodiment.

It has been also found, when the quantity of heat given from exhaust gas to the adsorbing member 17 has been studied, that there is a relationship between a received quantity of heat W and a supply time t as shown in FIG. 7. FIG. 7 shows a result of measurement of the received quantity of heat W when the amount of gas Q (and the adsorbing member inflow gas temperature) is changed. In FIG. 7, the horizontal axis represents the supplied time t and the vertical axis represents the received quantity of heat W of the adsorbing member 17. In FIG. 7, in a range up to 10 (kcal) of the received quantity of heat W, it has a linear relationship with the exhaust gas supplied time t (sec). When this relationship is illustrated in another form, it can be seen that the exhaust gas flow rate, i.e. the intake air flow rate Q, also has a linear relationship with a heat receiving rate k (kcal/sec) as shown in FIG. 8. That is, when the engine operating condition (here the flow rate Q) is known, the heat receiving rate k of the adsorbing member 17 is univocally determined. Therefore, it becomes possible to assume whether the desorption has been finished or not by multiplying an elapsed time while the exhaust gas has passed through the adsorbing member 17 with a certain flow rate Q by a heat receiving rate k corresponding to the certain flow rate Q to calculate the quantity of heat received by the adsorbing member 17 during that elapsed time and by accumulating the calculated quantity of heat.

It is noted that although the capacity of the adsorbing member (honeycomb structure) 17 has been 1000 cc in the study of the present embodiment, the quantity of heat received by the adsorbing member may be estimated even in a system having a different capacity by studying the relationship between k and Q in advance and by storing that relationship in the ECU 29 as a map. Further, a quantity of heat which the exhaust gas had lost has been derived as the quantity of heat W received by the adsorbing member in the study of the present embodiment. The quantity of heat which the exhaust gas had lost was calculated from the specific heat, density and temperature of the exhaust gas flowing into/out of the adsorbing member 17.

In the routine of the desorption process in FIG. 4, the ECU 29 finds the intake air flow rate Q in Step 108 and finds the heat receiving rate k with respect to the intake air flow rate Q in each time from the map shown in FIG. 8 in Step 110.

After that, the ECU 29 compensates oxygen necessary for purifying the desorbed HC in the tertiary catalyst 10 by implementing lean control by which the fuel injection amount is reduced. In more detail, normal air-fuel ratio feedback control is stopped and the basic fuel injection amount $\tau$ is reduced by 10%.

Then, the ECU 29 opens the electromagnetic valve 28 in Step 112 (at timing t3 in FIG. 5) to switch the changeover valve 20 to open the bypass passage 16 and to close the main passage 15. Due to this, the exhaust gas only flows through the adsorbing member 17. Then, the ECU 29 accumulates the received quantity of heat W (kcal) from the elapsed time t and the heat receiving rate k in Step 113. The ECU 29 compares the quantity of heat W with the predetermined value W1 (kcal), e.g. 10 kcal. If the quantity of heat W is lower than the predetermined value W1, the above-mentioned operation is repeated until it exceeds the predetermined value WI (period t3 to t4 in FIG. 5).

When the quantity of heat W exceeds the predetermined value WI, the ECU 29 shifts the process from Step 114 to Step 115 to turn off (close) the electromagnetic value 28. As a result, the change-over valve 20 is switched to close the bypass passage 16 (at timing t4 in FIG. 5). After that, the ECU 29 finishes lean control in Step 116 and restarts normal air-fuel ratio feedback control, thus finishing the series of desorption control.

At this time, because the adsorption unit 9 is installed in the bypass passage 16 separated from the main passage 15 by one partition 14, heat of the high temperature exhaust gas passing through the main exhaust passage 15 is transmitted readily to the adsorbing member 17. The adsorbing member 17 becomes hot in desorbing HC and desorbs the HC reliably.

In this way, by noticing on that the quantity of heat which is given from the exhaust gas to the adsorbing member 17 can be estimated from the engine operating condition, the determination of the timing for switching the change-over valve 20 during the desorption process, i.e., of the timing of the end of the desorption process, has been made possible without adding any particular sensors. Accordingly, it becomes possible to make the period of the desorption process accurately and shortly.

Second Embodiment

A second embodiment of the present invention will be explained below centering on a point different from the first embodiment.

Because the whole structure thereof is the same as that shown in FIG. 1, its explanation will be omitted here.

A major difference from the first embodiment described above is in control processing of the ECU 29. Specifically, in the second embodiment, a cooling state of the catalyst 10 is estimated during the desorption process and the change-over valve 20 is repeatedly opened/closed in order to maintain the activated state of the catalyst.

Figure 10:
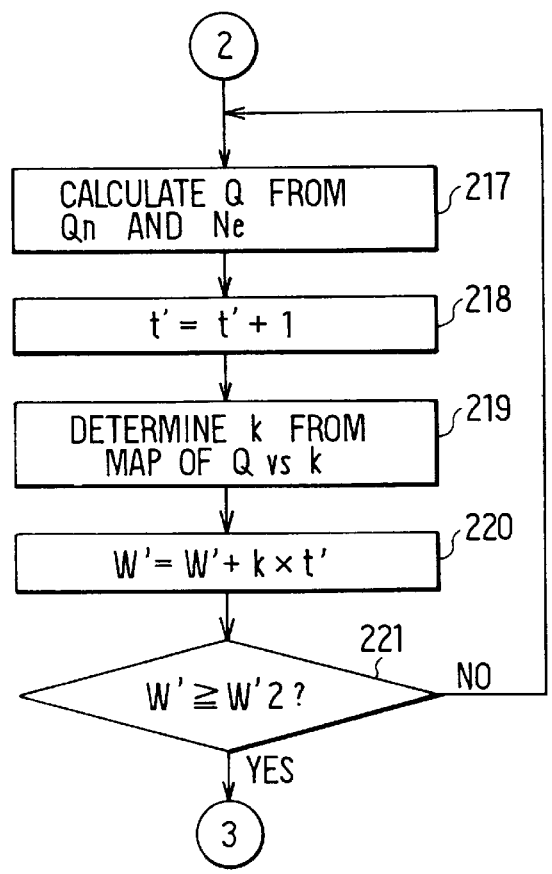
FIGS. 9 through 11 are flow diagrams showing operations of a second embodiment.

While the adsorption process is the same with that shown in FIG. 3, the desorption process which follows thereto is different. The desorption process of the present embodiment will be explained by using flow diagrams shown in FIGS. 9, 10 and 11. FIG. 12 is a timing chart for explaining the operation of the second embodiment.

When the desorption process starts, the ECU 29 causes exhaust gas to flow through the adsorbing member (honeycomb structure) 17 to desorb HC and stops the desorption when the quantity of heat reaches the predetermined received quantity of heat W2 (kcal) (at timing t14 in FIG. 12) as shown in Steps 206 through 216. This series of control is the same with that shown in Steps 106 through 116 in FIG. 4, so that its detailed explanation will be omitted here.

Figure 13:
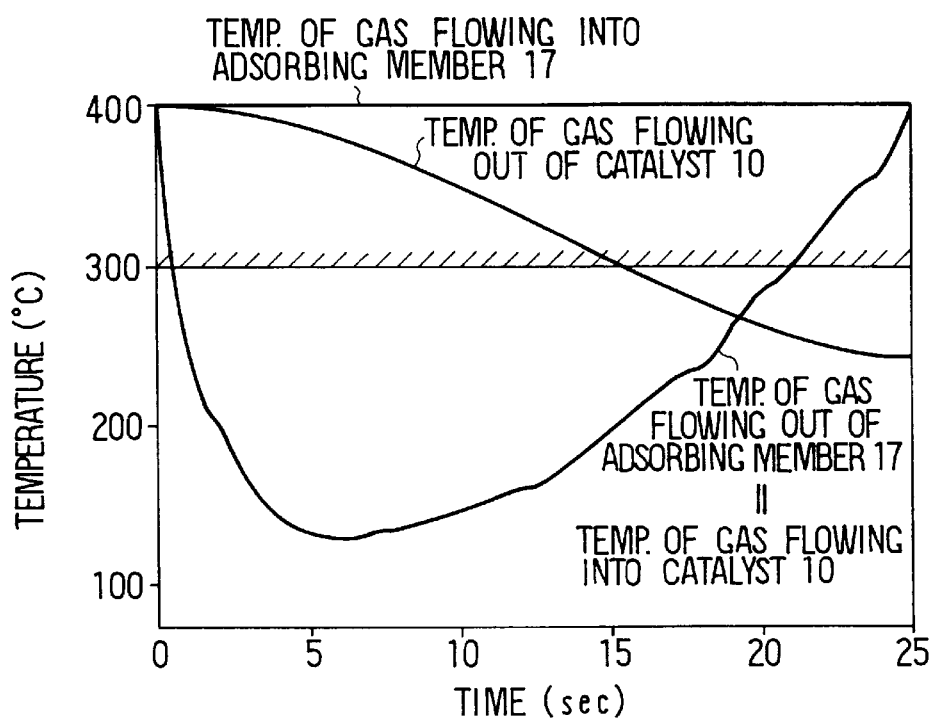
FIG. 13 is a graph showing the changes of temperature in the desorption process of the second embodiment.
Figure 14:
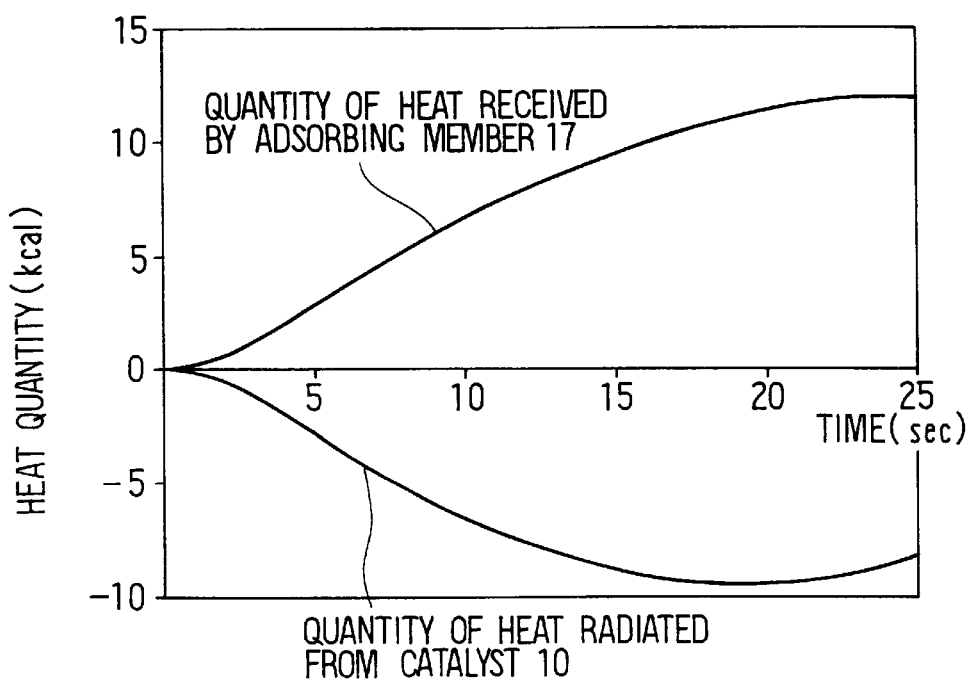
FIG. 14 is a graph showing a received heat quantity and a radiated heat quantity in the desorption process of the second embodiment.

At this time, because the adsorbing member 17 takes away heat of the exhaust gas flowing therethrough, the temperature of the exhaust gas flowing out of the adsorbing member 17 is lower than that of the exhaust gas flowing thereinto as shown in FIG. 13. Therefore, the cooled exhaust gas takes back heat from the tertiary catalyst 10, thus cooling the tertiary catalyst 10. FIG. 14 shows a relationship in terms of quantity of heat, in which the quantity of heat received by the adsorbing member 17 is almost equal with the quantity of heat radiated from the tertiary catalyst 10. Because the temperature of the exhaust gas flowing out of the tertiary catalyst 10 becomes lower than 300° C., i.e. the activation temperature when the quantity of heat W received by the adsorbing member 17 exceeds 10 (kcal), the catalyst. 10 cannot purify HC even at a time before the desorption ends.

For this reason, when the quantity of heat supplied to the adsorbing member 17 has reached, for example, 5 (kcal), the desorption process is suspended once. That is, the change-over valve 20 is controlled to supply the exhaust gas from the engine 1 directly to the catalyst 10. Due to this operation, the catalyst 10 is allowed to keep a temperature above the activation temperature. In the present embodiment, the quantity of heat which is equal with the quantity of heat supplied to the adsorbing member 17 is supplied to the catalyst 10 and the same map as for the adsorbing member 17 (i.e. FIG. 8) may be used with regard to the heat receiving rate k (kcal/sec) as apparent from FIG. 14.

It is noted that although the heat receiving rate k may be commonly used because the capacity of the adsorbing member 17 and the capacity of the tertiary catalyst 10 have been adjusted to the same value of 1000 cc, the present invention can be applied to a system in which their capacities are different. In this case, the relationships between k and Q with respect to both the adsorbing member and the catalyst may be studied beforehand and studied in the ECU 29 as a map.

Figure 9:
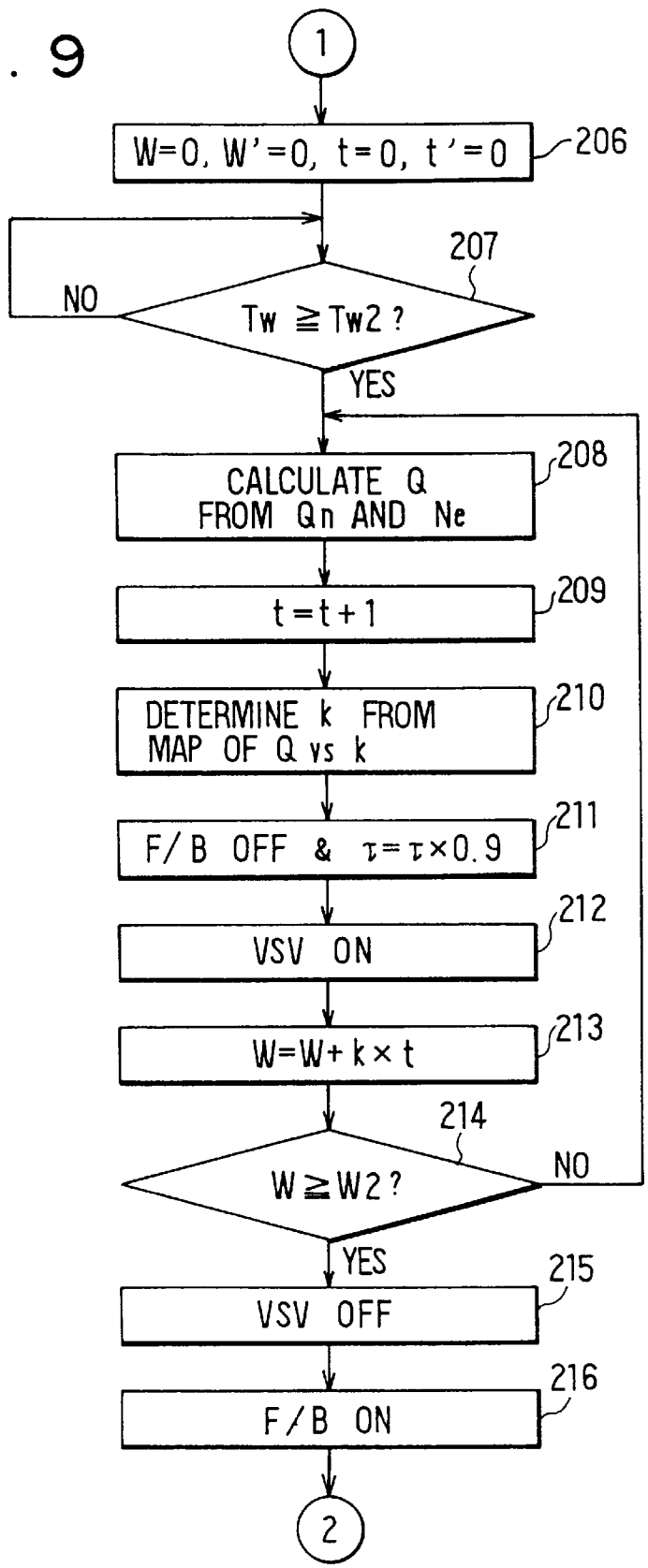

When the quantity of heat supplied to the adsorbing member 17 reaches W2 (kcal) (5 kcal in the present embodiment) in Step 214 in FIG. 9, the ECU 29 suspends the desorption process once in Steps 215 and 216 (at timing t14 in FIG. 12). Thereafter, the ECU 29 implements warm-up control for the tertiary catalyst 10 in Steps 217 through 221 in FIG. 10. More specifically, the desorption process is not resumed until the quantity of heat supplied to the tertiary catalyst 10 reaches W'2 (kcal) (5 kcal in the present embodiment) in Step 2;71.

Figure 11:
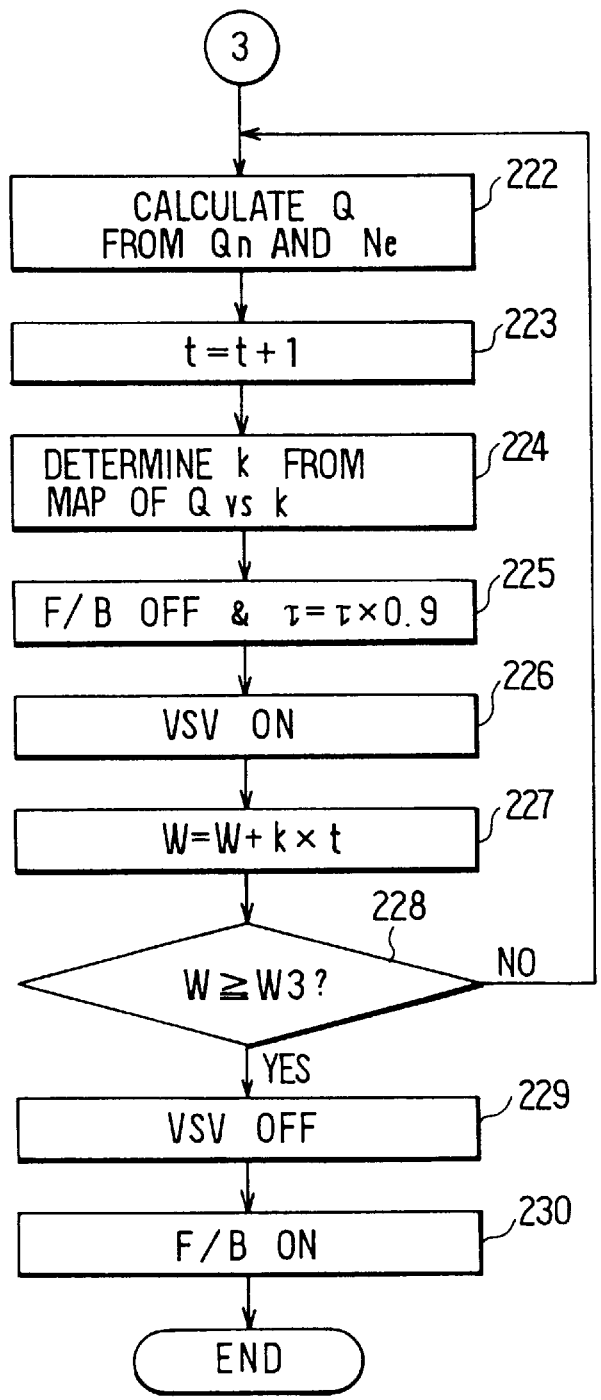
Figure 12:
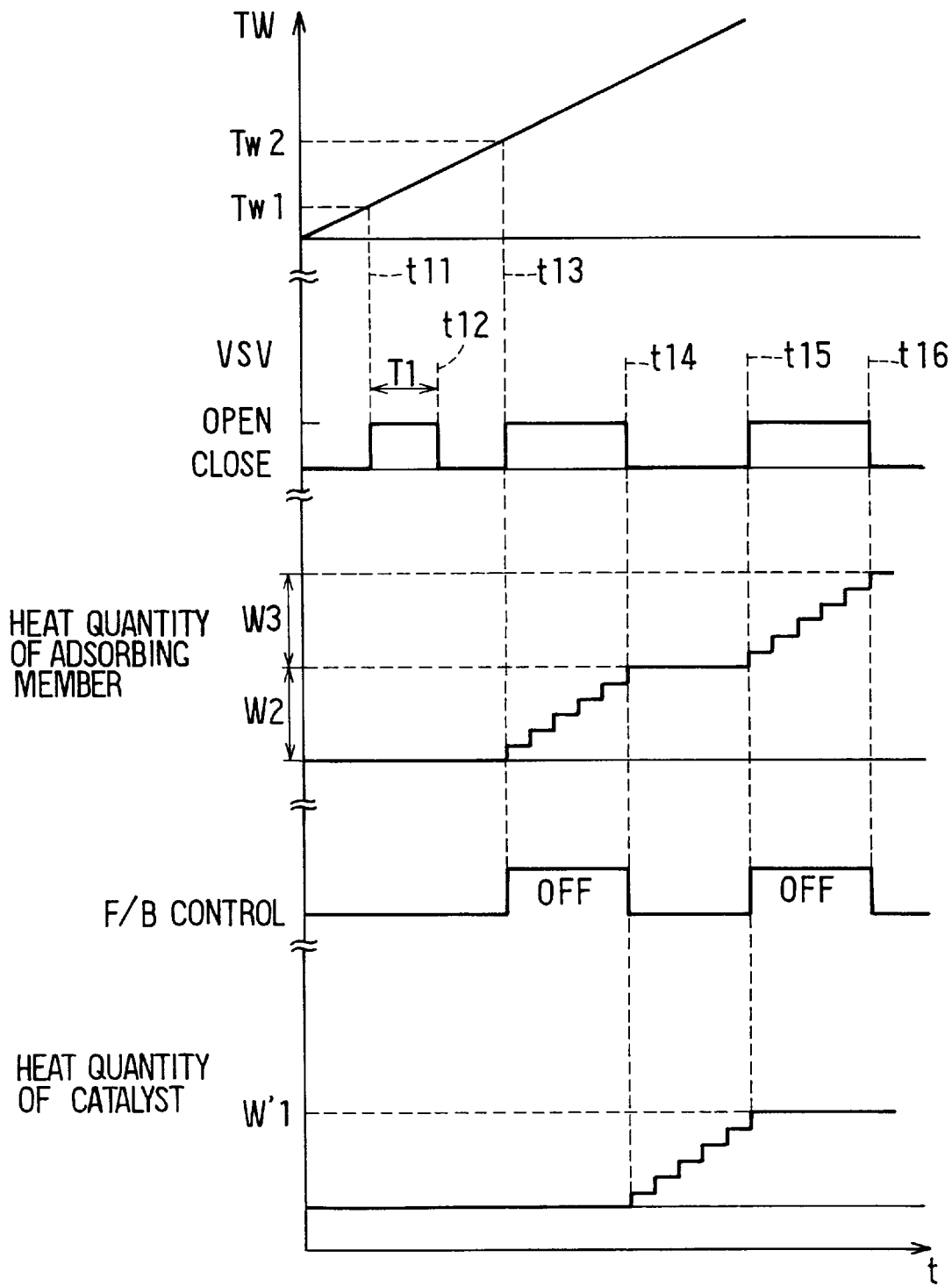
FIG. 12 is a time chart for explaining operations of the second embodiment.

When the quantity of heat exceeds the predetermined quantity W'2 (kcal), the ECU 29 resumes the desorption process to the adsorbing member 17 in Steps 222 through 230 in FIG. 11 (at timing t15 in FIG. 12). Then, when the quantity of heat W exceeds the remaining required quantity of heat W3 (kcal) (5 kcal in the present embodiment), the ECU 29 terminates the series of desorption process in Step 230 (at timing t16 in FIG. 12).

Beside the embodiments described above, the present invention may be modified as follows.

Figure 15:
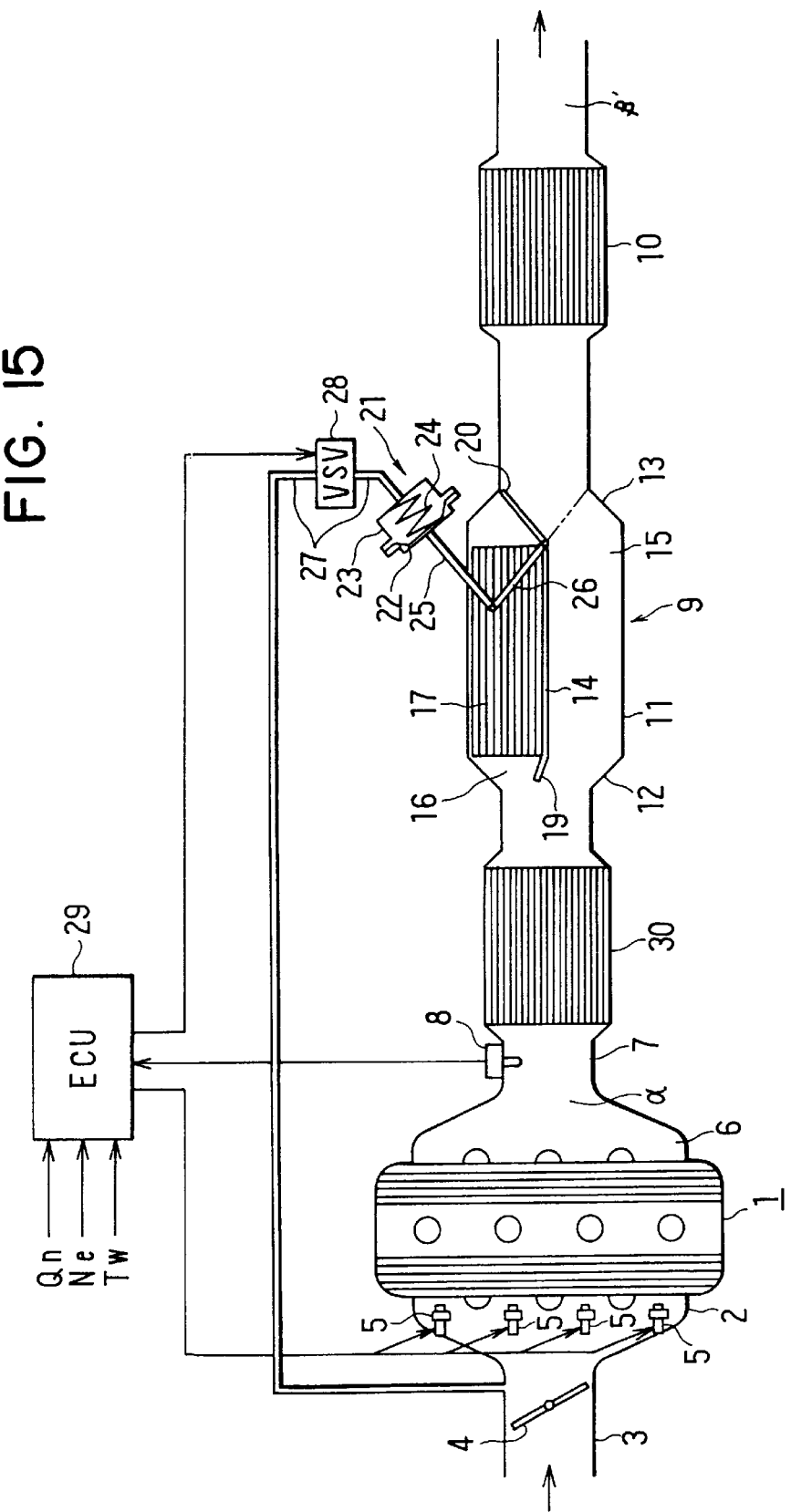
FIG. 15 is a schematic diagram illustrating a modification of the present invention.
Figure 16:
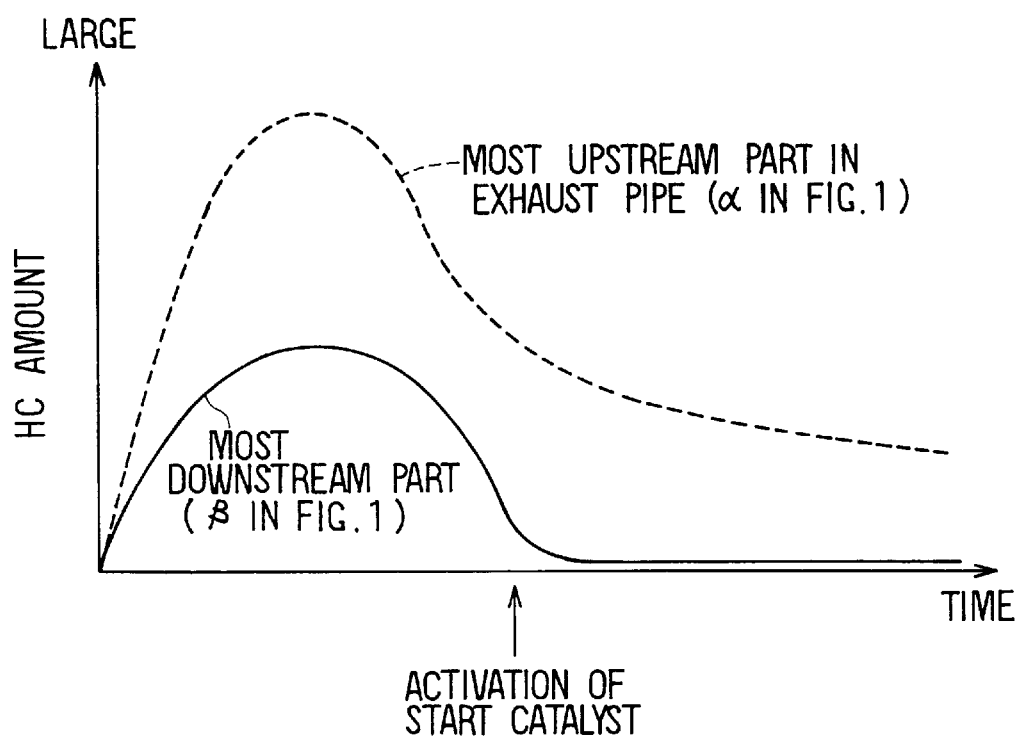
FIG. 16 is a time chart showing changes of an amount of HC in the system shown in FIG. 15.

Although the catalyst 10 has been disposed at the downstream side of the adsorbing member 17 in each embodiment described above, a start catalyst 30 may be provided at the upstream side of the adsorbing member 17 as shown in FIG. 15 to enhance the purification. Because HC which has been emitted slightly between the end of the adsorption and the activation of the catalyst 10 is purified by the start catalyst 30, the emitted HC can be reduced further than the system shown in FIG. 1. That is, although the amount of HC increases during the period from the end of the adsorption process till when the catalyst 10 at the downstream side is activated in the first embodiment shown in FIG. 6, the use of the start catalyst 30 as shown in FIG. 15 allows the emission of HC to be suppressed since the start catalyst 30 is activated quickly as shown in FIG. 16.

Further, it is appropriate to set an upper limit value of the intake air flow rate Q which permits the desorption process to be executed in order not to drop the drivability.

Although the intake air flow rate (liter/min) obtained by multiplying the value of Qn by the value of Ne has been used in calculating the quantity of heat given from the exhaust gas to the adsorbing member 17 from the start of the desorption process, it is also possible to use an intake air amount Qn (liter/rev) per one rotation of the engine, instead of the flow rate Q. Further, it is possible to calculate the quantity of heat by finding the flow rate Q from the intake negative pressure Pm (Pa) and the engine speed Ne (rpm). Upper limit values may be set on the engine speed Ne (rpm) and the engine negative pressure Pm (Pa), respectively, also in this case.

Further, although HC has been supposed as the harmful component within the exhaust gas to be adsorbed to the adsorbing member 17 in the embodiments described above, the present invention may be applied to a system having an adsorbing member for adsorbing harmful components other than HC.

Still more, although the change-over valve 20 has been provided at the end of the main exhaust passage 15 and the bypass passage 16 at the downstream side in the embodiments described above, the change-over valve 20 may be provided at the end of the main exhaust passage 15 and the bypass passage 16 at the upstream side.

Although the desorption process is divided into two parts in the second embodiment, it can be divided into three parts or more.

While the preferred embodiments have been described, variations thereto will occur to those skilled in the art within the scope of -the present inventive concepts which are delineated by the following claims.

What is claimed is:

1. An engine exhaust gas purifying system comprising:
   a bypass passage provided to an exhaust pipe of an engine;
   an adsorbing member disposed in the bypass passage, for adsorbing harmful components within exhaust gas;
   an exhaust gas passage switching device for alternatively switching an exhaust gas passage between the bypass passage and the exhaust pipe;
   first control means for controlling the exhaust gas passage switching device during an adsorption mode so that exhaust gas flows through the bypass passage, whereby the adsorbing member adsorbs the harmful components within exhaust gas;
   second control means for controlling the exhaust gas passage switching device during a desorption mode so that exhaust gas flows through the bypass passage, whereby the exhaust gas flowing therethrough causes desorption of the harmful components adsorbed by the adsorbing member;

given heat quantity calculation means for calculating heat quantity which the exhaust gas flowing through the bypass passage during the desorption mode gives to the adsorbing member, based on an operational state of the engine; and third control means for controlling the exhaust gas passage switching device to cause exhaust gas to flow through the exhaust pipe when the heat quantity given to the adsorbing member exceeds a first predetermined value corresponding to heat quantity required for completion of harmful component desorption from the adsorbing member.

2. An engine exhaust gas purifying system according to claim 1, wherein the given heat quantity calculation means calculates the heat quantity based on a heat receiving rate and an elapsed time and accumulates the calculated heat quantity, the heat receiving rate being heat quantity that the adsorbing member receives from the exhaust gas flowing through the bypass passage per unit time.

3. An engine exhaust gas purifying system according to claim 2, wherein the heat receiving rate correlates with and is derived from an intake air flow rate to an engine.

4. An engine exhaust gas purifying system according to claim 1, wherein the adsorption mode is carried out when a temperature of a cooling water for the engine is equal to or lower than a predetermined temperature.

5. An engine exhaust gas purifying system according to claim 4, wherein the adsorption mode is ended when a predetermined time has elapsed from start of the adsorption mode.

6. An engine exhaust gas purifying system according to claim 1, wherein the desorption mode is carried out when a temperature of a cooling water for the engine is equal to or higher than a predetermined temperature.

7. An engine exhaust gas purifying system according to claim 1, wherein the adsorbing member adsorbs the harmful components within exhaust gas when a temperature of the adsorbing member is low.

8. An engine exhaust gas purifying system according to claim 6, wherein the exhaust gas is capable of desorbing the harmful components held at the adsorbing member by its heat when the temperature of the cooling water is equal to or higher than the predetermined temperature.

9. An engine exhaust gas purifying system according to claim 5, wherein the predetermined time corresponds to a period of time necessary for a temperature of exhaust gas to exceed a temperature below which the adsorbing member is capable of adsorbing the harmful components.

10. An engine exhaust gas purifying system according to claim 1, further comprising a catalyst disposed in the exhaust pipe on a downstream side of the adsorbing member, said catalyst purifying the harmful components of exhaust gas.

11. An engine exhaust gas purifying system according to claim 1, wherein the engine is provided with an fuel injection amount control apparatus which performs feedback control so that an air fuel ratio approaches to a stoichiometric air fuel ratio, and feedback control of the fuel injection amount control apparatus is suspended during the desorption mode, and a fuel injection amount during suspension of feedback control is made smaller than that during performance of feedback control.

12. An engine exhaust gas purifying system according to claim 11, wherein the fuel injection amount control apparatus resumes feedback control of air fuel ratio after the desorption mode ends.

13. An engine exhaust gas purifying system according to claim 10, wherein the third control means controls the exhaust gas passage switching device to cause exhaust gas to flow through the exhaust pipe to warm up the catalyst when the heat quantity calculated by the given heat quantity calculating means reaches a second predetermined value, and the third control means further controls the exhaust gas passage switching device to cause exhaust gas to flow through the bypass passage again until a total value of heat quantity calculated by the given heat quantity calculating means reaches the first predetermined value.

14. An engine exhaust gas purifying system according to claim 13, wherein the given heat quantity calculation means calculates the heat quantity based on a heat receiving rate and an elapsed time, the heat receiving rate being heat quantity that the adsorbing member receives from the exhaust gas flowing through the bypass passage per unit time.

15. An engine exhaust gas purifying system according to claim 14, wherein the heat receiving rate correlates with and is derived from an intake air flow rate to an engine.

16. An engine exhaust gas purifying system according to claim 1, wherein the third control means controls the exhaust gas passage switching device to cause exhaust gas to flow through the exhaust pipe to suspend the desorption mode when the heat quantity calculated by the given heat quantity calculating means reaches a second predetermined value lower than the first predetermined value, and the third control means further controls the exhaust gas passage switching device to cause exhaust gas to flow through the bypass passage again until a total value of heat quantity calculated by the given heat quantity calculating means reaches the first predetermined value to completely desorb the harmful components from the adsorbing member.

17. An engine control system for purifying exhaust gas from an engine comprising:

an adsorbing member disposed in a bypass passage of an exhaust pipe, for adsorbing harmful components of exhaust gas;

a catalyst disposed in the exhaust pipe on a downstream side of the adsorbing member for purifying the harmful components of exhaust gas;

desorption means for causing the adsorbing member to desorb the harmful components by supplying heat thereto; and heat quantity calculation means for calculating total heat quantity supplied to the adsorbing member by the desorption means, wherein the desorption means stops supplying heat to the adsorbing member when the heat quantity supplied to the adsorbing member exceeds a first predetermined value corresponding to heat quantity required for completion of harmful component desorption from the adsorbing member.

18. An engine control system according to claim 17, wherein the desorption means supplies heat to the adsorbing member by causing hot exhaust gas to flow through the bypass passage.

19. An engine control system according to claim 18, wherein the heat quantity calculation means calculates the total heat quantity based on a heat receiving rate and an elapsed time, the heat receiving rate being heat quantity that the adsorbing member receives from the exhaust gas flowing through the bypass passage per unit time.

20. An engine control system according to claim 19, wherein the heat receiving rate correlates with and is derived from an intake air flow rate of the engine.

21. An engine control system according to claim 17, wherein the adsorbing member adsorbs the harmful components when a temperature of exhaust gas is equal to or lower than a predetermined temperature.

22. An engine control system according to claim 17, further comprising
a start catalyst disposed in the exhaust pipe on an upstream side of the adsorbing member.

23. An engine control system according to claim 17, further comprising:
an fuel injection amount control apparatus which performs feedback control so that an air fuel ratio approaches to a stoichiometric air fuel ratio,
wherein feedback control of the fuel injection amount control apparatus is suspended while the desorption means causes the adsorbing member to desorb the harmful components, and a fuel injection amount during suspension of feedback control is made smaller than that during performance of feedback control.

24. An engine control system according to claim 18, wherein the desorption means causes exhaust gas to reach the catalyst without flowing through the adsorbing member to warm up the catalyst when the heat quantity calculated by the heat quantity calculating means reaches a second predetermined value lower than the first predetermined value, and thereafter, the desorption means causes exhaust gas to flow through the adsorbing member again until a total value of heat quantity calculated by the heat quantity calculating means reaches the first predetermined value.

* * * * *